United States Patent [19]

Parker et al.

[11] 4,072,241
[45] Feb. 7, 1978

[54] AGRICULTURAL VEHICLE FOR TRANSPORTING HAY BALES

[76] Inventors: Gary D. Parker, 9070 G.P. Inc. Rte. 1, Moran, Kans. 66755; E. S. Robb, Box 703, Iola, Kans. 66749

[21] Appl. No.: 755,679

[22] Filed: Dec. 30, 1976

[51] Int. Cl.² .............................................. B60P 3/00
[52] U.S. Cl. .................................... 214/392; 294/107
[58] Field of Search ............... 214/390, 392, 394, 396, 214/DIG. 4, 652, 147 G, 650; 294/67 BC, 113, 106

[56] References Cited

U.S. PATENT DOCUMENTS

| | | | |
|---|---|---|---|
| 1,244,783 | 10/1917 | Ruckes | 214/392 |
| 2,266,866 | 12/1941 | Houston | 214/392 |
| 2,832,634 | 4/1958 | Bergerson | 294/107 |
| 3,523,410 | 9/1970 | Taylor et al. | 280/473 |

FOREIGN PATENT DOCUMENTS

| | | | |
|---|---|---|---|
| 1,180,289 | 6/1969 | France | 214/390 |
| 1,948,051 | 9/1969 | Germany | 214/394 |

*Primary Examiner*—Drayton E. Hoffman
*Assistant Examiner*—Lawrence E. Williams
*Attorney, Agent, or Firm*—Fishburn, Gold & Litman

[57] ABSTRACT

An agricultural vehicle for collecting and transporting hay bales includes a mobile frame having laterally spaced side members each having a plurality of bale lifting and supporting members movably mounted thereon and arranged in longitudinally spaced and laterally opposed pairs. The agricultural vehicle includes power means for moving the bale lifting and supporting members between a depending position and a bale supporting position. The agricultural vehicle may be a trailer and includes a tongue member pivotally connected to a forward end of one of the frame side members and movable between a first position with the vehicle and a prime mover in longitudinal alignment and a second position with the vehicle parallel with and laterally offset from prime mover.

13 Claims, 12 Drawing Figures

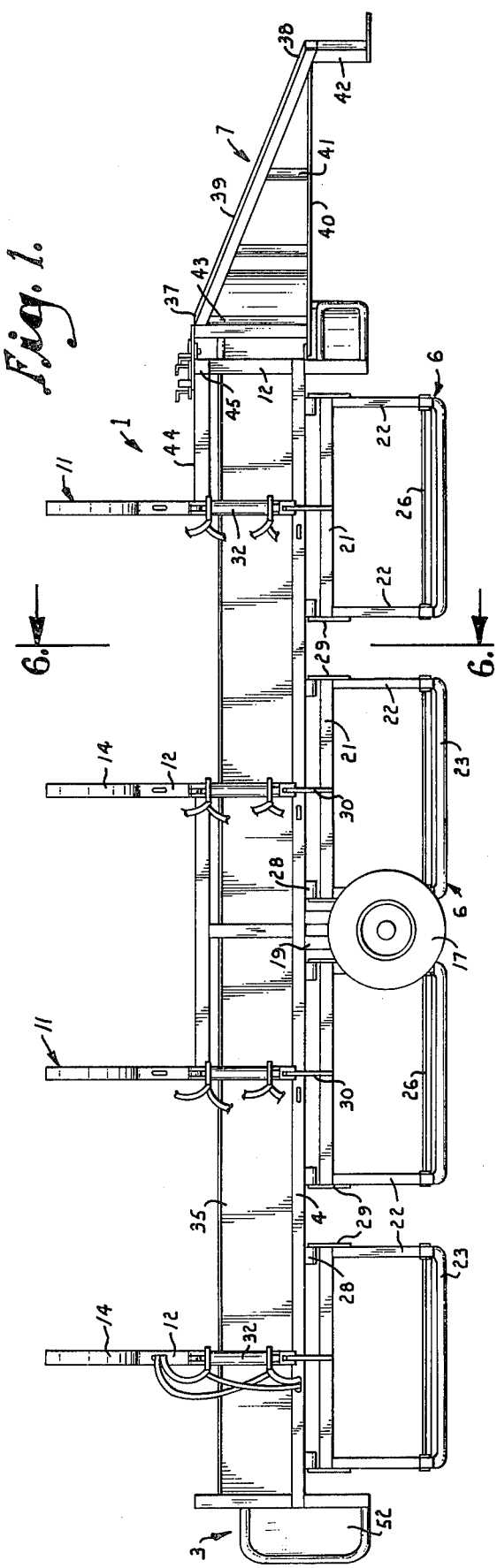
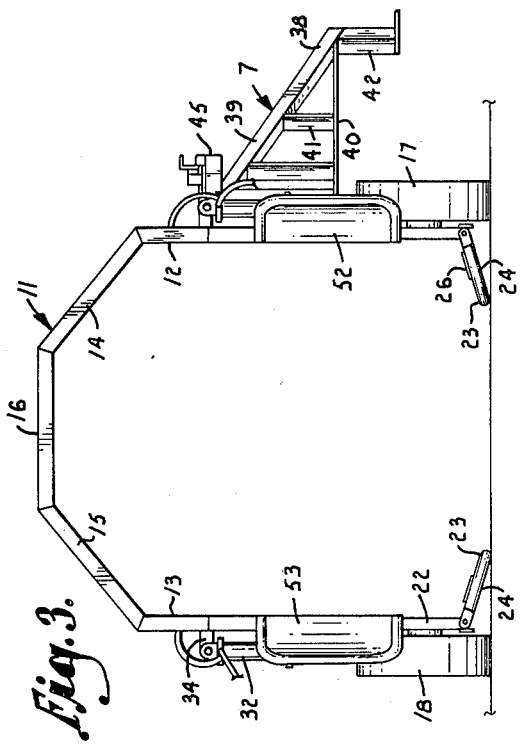
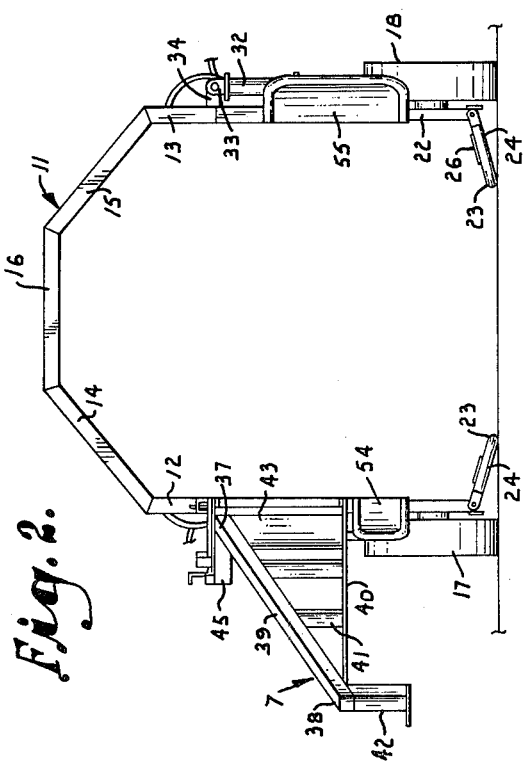

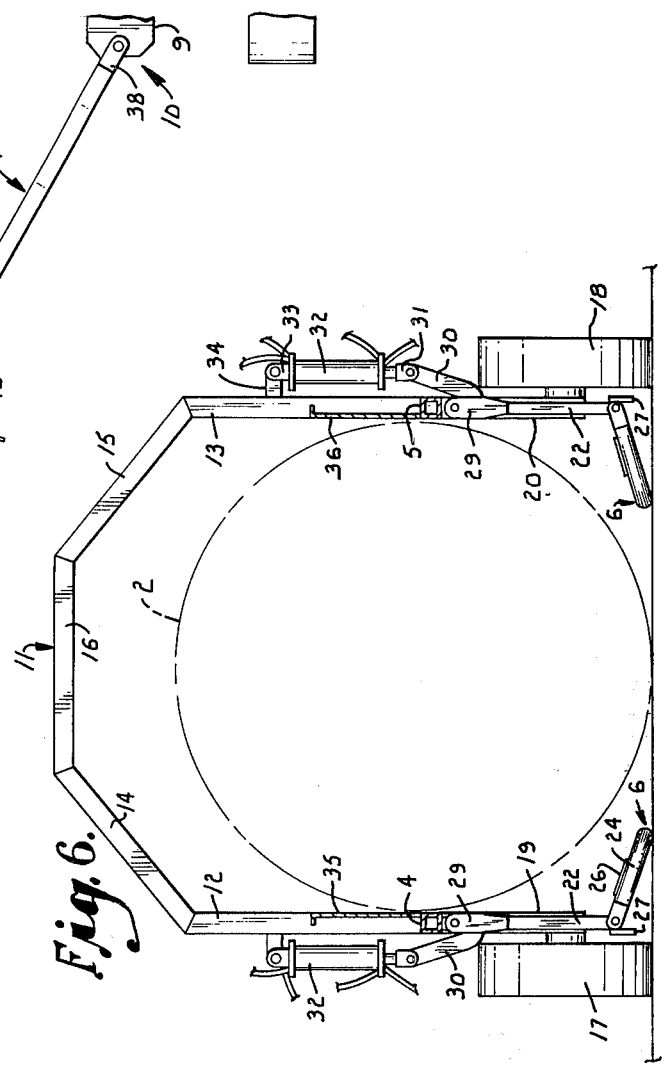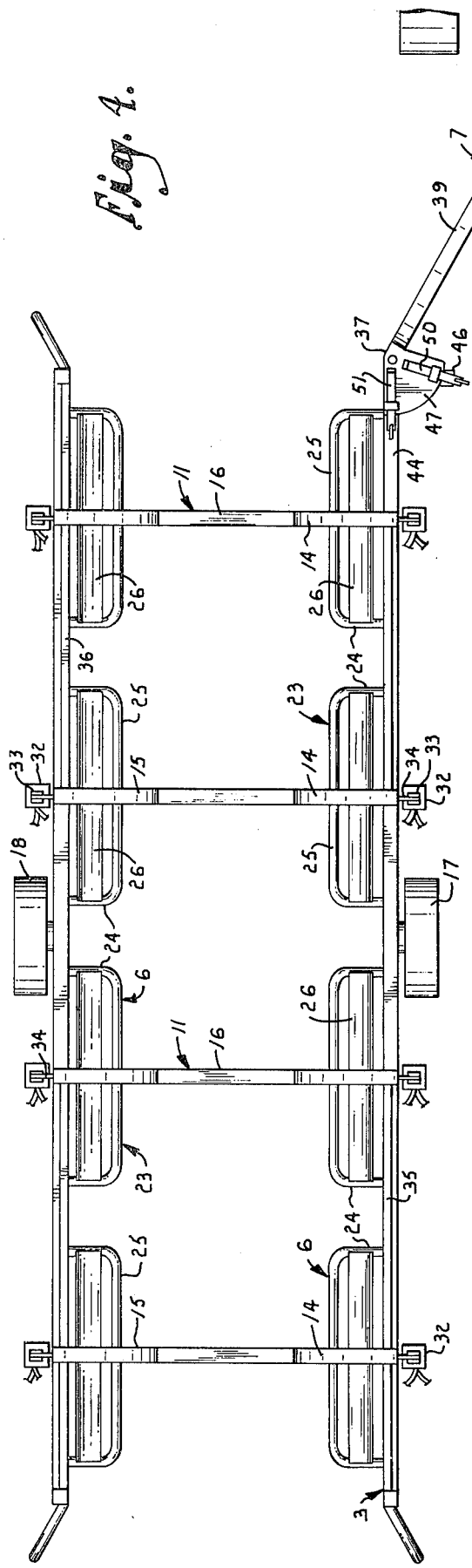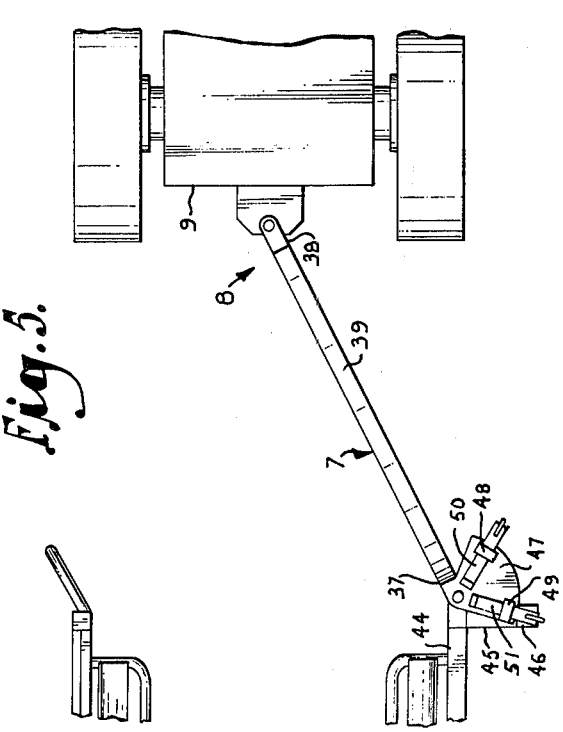

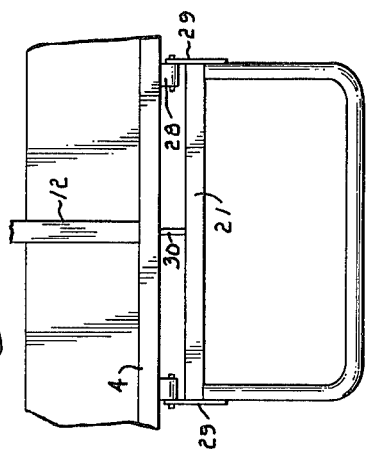
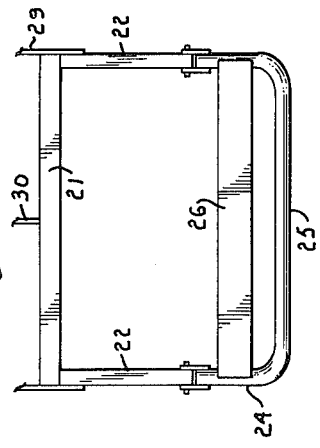
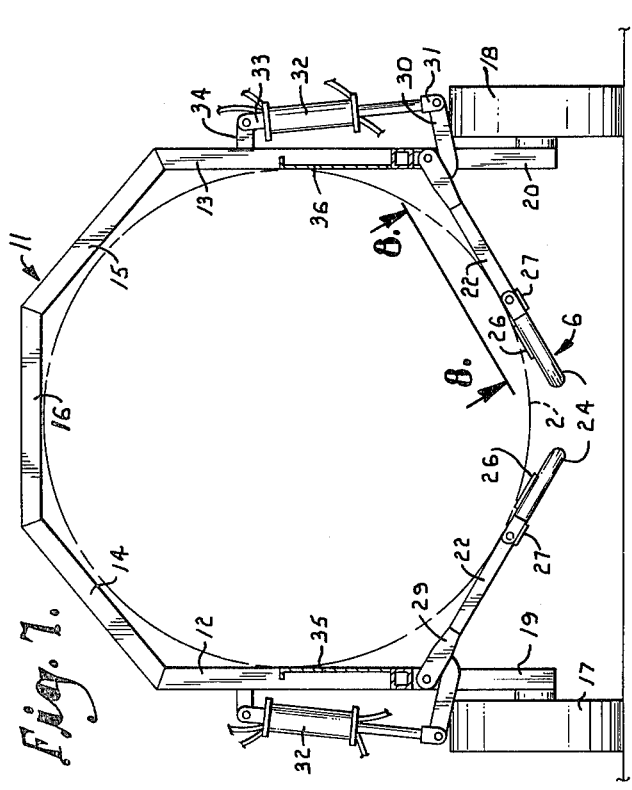
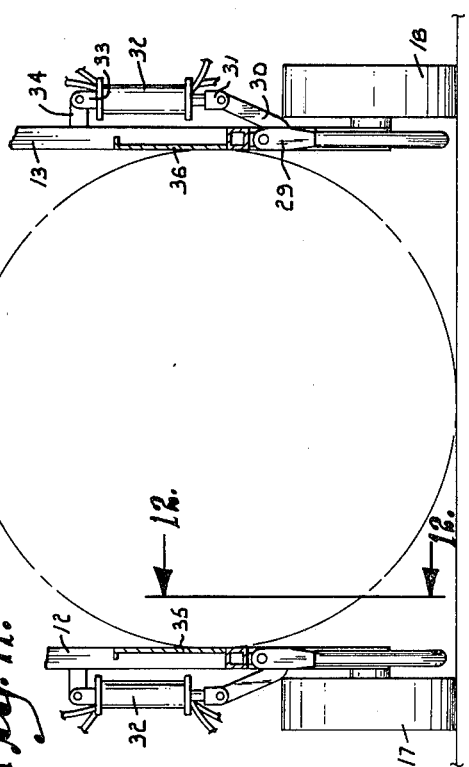
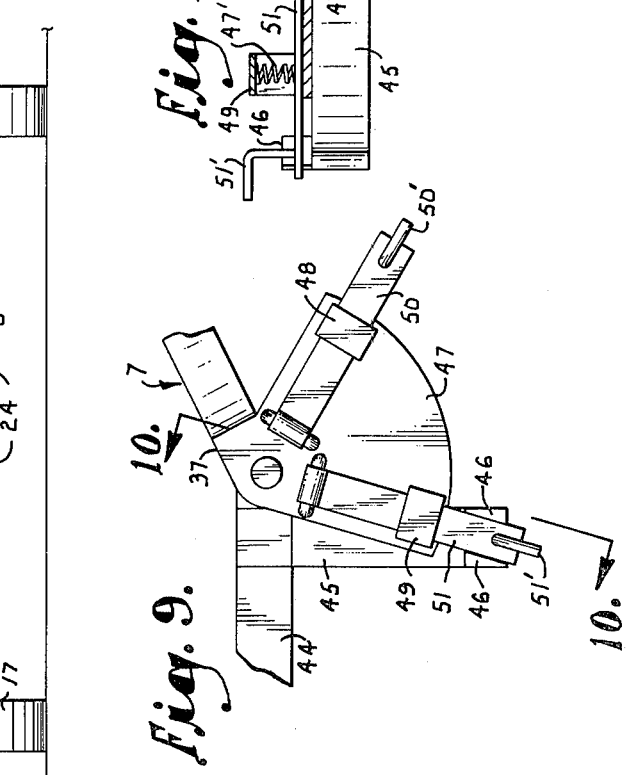

AGRICULTURAL VEHICLE FOR TRANSPORTING HAY BALES

The present invention relates to agricultural vehicles and more particularly to an agricultural vehicle for collecting and transporting hay bales and the like.

The principal objects of the present invention are: to provide an agricultural vehicle particularly adapted to collect large round hay bales from fields and transport a plurality of the bales to barns or other storage or use locations; to provide such an agricultural vehicle having a frame adapted to move over and straddle a hay bale or bales in the field and lift same to a carrying position; to provide such an agricultural vehicle wherein the frame is capable of moving forwardly to straddle hay bales or moving rearwardly to straddle the hay bales prior to lifting thereof; to provide such an agricultural vehicle having a tongue member movable between a first position or bale collecting position with the vehicle and a prime mover parallel and laterally offset and a second position or bale transporting position with the vehicle and prime mover in substantial longitudinal alignment; to provide such an agricultural vehicle capable of moving over fields or paved roads; and to provide such an agricultural vehicle which is economical to manufacture, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the agricultural trailer.

FIG. 1 is a side elevational view of an agricultural vehicle embodying features of the present invention.

FIG. 2 is an end elevational view of a forward end of the agricultural vehicle.

FIG. 3 is an end elevational view of a rear end of the agricultural vehicle.

FIG. 4 is a top plan view of the agricultural trailer with a tongue member positioned so that the agricultural vehicle is in a bale collecting position.

FIG. 5 is a fragmentary top plan view showing the tongue member positioned so that the agricultural vehicle is in a bale transporting position.

FIG. 6 is an enlarged transverse sectional view taken on line 6—6 of FIG. 1 and showing a bale lifting and supporting member in a depending or lower position.

FIG. 7 is an enlarged transverse sectional view similar to FIG. 6 except showing the bale lifting and supporting member in a raised position.

FIG. 8 is an enlarged fragmentary elevational view of a bale lifting and support member.

FIG. 9 is a further enlarged fragmentary enlarged top plan view of cooperating means for retaining the tongue member in one of first and second positions.

FIG. 10 is a further enlarged fragmentary transverse sectional view taken on line 10—10 of FIG. 9 and showing a retainer member and bar.

FIG. 11 is a fragmentary enlarged transverse sectional view similar to and at the same scale as FIG. 6 except showing a modified bale lifting and support member.

FIG. 12 is an enlarged fragmentary elevational view of the modified bale lifting and support member.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally an agricultural vehicle for collecting and transporting hay bales 2. The agricultural vehicle 1 includes a mobile frame 3 having laterally spaced side members 4 and 5 each having at least one and preferably a plurality of bale lifting and supporting members 6 movably mounted thereon and arranged in longitudinally spaced and laterally opposed pairs. The agricultural vehicle 1 includes power means for moving the bale lifting and supporting members 6 between a depending position and a bale supporting position. In the illustrated structure, the agricultural vehicle 1 is a trailer and includes a tongue member 7 pivotally connected to a forward end of one of the frame side members, for example side member 4, and movable between a bale transporting or first position 8 with the vehicle 1 and a prime mover 9 in longitudinal alignment and a bale collecting or second position 10 with the vehicle 1 parallel with and laterally offset from the prime mover 9.

The vehicle frame 3 is generally in the form of an elongated arch open between the side members 4 and 5 and includes a plurality of longitudinally spaced transverse frame members 11 extending between the side members 4 and 5 and over the hay bales 2 carried in the agricultural vehicle 1. The frame transverse members 11 are preferably generally U-shaped and each include first and second upstanding portions 12 and 13 extending upwardly from the frame side members 4 and 5 respectively. First and second inclined portions 14 and 15 extend upwardly and inwardly from the first and second upstanding portions 12 and 13 respectively. Each frame transverse member 11 includes a top portion or member 16 extending between upper ends of the respective first and second inclined portions 14 and 15.

The vehicle frame 3 is mobile and includes a plurality of rotatably mounted wheels illustrated as first and second wheels 17 and 18 mounted on and positioned below the frame side members 4 and 5 respectively. Support members 19 and 20 depend from the frame side members 4 and 5 respectively, and, in the illustrated structure, are positioned at the mid-point thereof. A suitable axle extends outwardly from each of the support members 19 and 20 and has one of the wheels 17 and 18 rotatably mounted thereon.

The agricultural vehicle 1 includes a plurality of the bale lifting and supporting members 6 mounted on the frame 3. The bale lifting and supporting members 6 are arranged or at least one pair of opposed members and preferably as a plurality of members 6 in longitudinally spaced and laterally opposed pairs with each pair operative to lift and support one hay bale 2. Each bale lifting and supporting member 6 depends from a respective one of the frame side members 4 and 5 and is movably mounted thereon. The bale lifting and supporting members 6 each include an upper longitudinally extending member 21 pivotally supported on and depending from a respective one of the frame side members 4 and 5. A plurality of arms 22 are mounted on and extend laterally from the respective upper member 21. A lower member 23 is mounted on the arms 22 and is movable therewith into and out of engagement with a side of a respective hay bale 2.

The illustrated lower member 23 of each of the bale lifting and supporting member 6 includes a plurality of arm extensions 24 each pivotally mounted on a respective one of the bale lifting and supporting member arms 22. A connection member 25 is mounted on and extends between the arm extensions 24 and is engageable with a hay bale 2. A wall member 26 is mounted on the arm extensions 24 and positioned between the connecting member 25 and the pivotal connection of the arm extensions 24 on the bale lifting and supporting arms 22.

The lower member 23 is pivotally mounted on the arms 22 and supports the hay bale 2 after lifting same. Stop or abutment members 27 are mounted on each of the bale lifting and supporting member arms 22 and the abutment members 27 are engageable by the respective arm extensions 24 and retain the arm extensions 24 in bale supporting position after pivotal movement of the upper member 21 and the arms 22 extending therefrom to the bale support position.

The agricultural vehicle 1 includes means on the frame 3 and operatively connected to each of the bale lifting and supporting members for selectively moving same between a depending position and a bale supporting position. In the illustrated embodiment, a plurality of pivot pin support members 28 are mounted on and depend from each of the frame side members 4 and 5. A plurality of ears 29 extend from the upper member 21 of each of the bale lifting and supporting members 6. Each ear 29 is positioned to receive a pivot pin extending from a respective adjacent pivot pin support member 28.

An arm 30 extends from the upper member 21 of each of the bale lifting and supporting members 6 and has one end portion 31 of a suitable extensible member 32 pivotally mounted thereon. Each extensible member 32 has the other or opposite end portion 33 thereof pivotally mounted on a suitable bracket 34 extending outwardly from an exterior side of a respective one of the first and second upstanding portions 12 and 13 of the frame transverse members 11.

The extensible members 32 are each operatively connected to the prime mover 9 and flexible flow lines extend along one of the frame side members and between the frame side members 4 and 5 by extending along the frame transverse members 11. It is, therefore, desirable to prevent engagement of the hay bales 2 with the flexible flow lines communicating with the plurality of extensible members 32. In the illustrated embodiment, side walls 35 and 36 are mounted on interior faces of the frame side members 4 and 5, and the respective first and second upstanding portions 12 and 13.

The tongue member 7 has one end portion 37 connected to the forward end of the vehicle frame 3 and an opposite end portion 38 capable of being connected to the prime mover 9. The illustrated tongue member 7 is generally triangularly shaped and includes an upper member 39 and a lower member 40 diverging from the opposite or leading end portion 38. A plurality of longitudinally spaced brace members 41 extend between the upper and lower members 39 and 40 of the tongue member 7.

The other or opposite end portion 38 of the tongue member 7 may be pivotally mounted on the prime mover in any conventional manner. The illustrated tongue member forward or opposite end portion 38 includes an end member 42 depending from the upper and lower members 39 and 40 having a lower end thereof pivotally connected to the prime mover 9.

The tongue member rear or one end portion 37 is pivotally connected to the forward end of one of the frame side members, for example the first side member 4, and is movable between a first position 8 with the trailer 1 and prime mover 9 in longitudinal alignment and a second position 10 with the vehicle 1 substantially parallel with and laterally offset from the prime mover 9.

The tongue member rear or one end portion 37 includes and is defined by an end member 43 extending between the upper and lower members 39 and 40 of the elongated tongue member 7. It is desired to reinforce the forward end of the one or first frame side member 4 adjacent the connection of the tongue member 7 and the forward end of the frame 3. Therefore, a brace member 44 extends between a forward upstanding portion 12 and an adjacent upstanding portion 12 and is above and substantially parallel with the frame one side member 4.

The tongue member one end portion 37 and the forward upstanding portion 12 on the forward end portion of the frame one side member 4 includes cooperating means for retaining the tongue member 7 in one of the first or bale transporting position 8 and the second or bale collecting position 10. The illustrated cooperative means includes an arm 45 extending outwardly from the forward upstanding portion 12 of the frame one side member 4 and having a top or upper surface co-planar with a top or upper surface of the brace member 44. The arm has a free end thereof spaced from the forward upstanding portion 12 on the frame one side member 4 and has spaced stop positions or abutments 46 extending upwardly from the top or upper surface thereof.

The tongue member one or rear end portion 37 includes a planar extension 47 positioned above the top or upper surface of the arm 45 and the brace member 44. The planar extension 47 has an end edge which is spaced from the upstanding abutments 46 on the arm 45. The planar extension 47 includes first and second retainer members 48 and 49 positioned adjacent leading and trailing edges thereof. Each retaining member 48 is illustrated as an inverted U-shaped member formed of structural plate or the like and extending upwardly from an upper surface of the planar extension 47. The retaining members 48 and 49 are positioned adjacent the end edge of the planar extension 47 and are arranged to define a respective passage therethrough radially aligned with the pivot axis of the tongue member rear end portion 37.

First and second or leading and trailing planar bars 50 and 51 extend through the first and second retainer members 48 and 49 respectively and have one end portion thereof hingedly mounted on the planar extension 47 adjacent the pivot axis and arranged so that the bars 50 and 51 extend radially from the pivot axis of the tongue member rear end portion 37 through and beyond the retainer members 48 and 49 respectively. The planar bars 50 and 51 are hingedly mounted so that they may be moved over the upstanding abutments 46, as by handles 50' and 51' respectively, when the tongue member 7 is being moved between the first position 8 and the second position 10.

When the tongue member 7 is in the first position 8, the trailing or second planar bar 51 is between the upstanding abutments 46 thereby engaging same if the tongue members 7 moves toward the second position 10. When the tongue member 7 is in the second position 10, the leading or first planar bar 50 is between the upstanding abutments 46 thereby engaging same if the tongue member 7 moves the first position 8.

When the agricultural vehicle 1 is being moved with the tongue member 7 in either the first position 8 or the second position 10, it is desirable to retain the respective first or second retainer bar 50 or 51 in engagement with and between the upstanding abutments 46, therefore, the first and second retainer members 48 and 49 each have a suitable resilient member 47 mounted therein and in engagement with the respective bar 50 or 51, as best seen in FIG. 10.

First and second rear bale guides 52 and 53 are mounted on and extend rearwardly and diverge rearwardly and outwardly from the first and second upstanding portions 12 and 13 respectively adjacent the trailing end of the vehicle frame 3. When the agricultural vehicle 1 is being backed into a position straddling a hay bale or bales 2, the rear bale guides 52 and 53 cooperate to urge the bale or bales 2 into longitudinal alignment with the longitudinal center line of the vehicle frame 3 thereby positioning same to be lifted and supported by the respective pair of bale lifting and supporting members 6.

First and second forward bale guides 54 and 55 are mounted on and extend forwardly and diverge forwardly and outwardly from the first and second upstanding portions 12 and 13 respectively adjacent the forward end of the trailer frame 3. When the agricultural vehicle 1 is being pulled forward while the vehicle 1 is substantially aligned with the longitudinal axis of the hay bale or bales 2, engagement of the hay bale or bales 2 by the first and second forward bale guides 54 and 55 urge the hay bale or bales 2 into longitudinal alignment with the longitudinal center line of the trailer frame 3 thereby positioning same to be lifted and supported by the respective pair of bale lifting and supporting members 6.

In using an agricultural vehicle constructed as illustrated and described, for loading a plurality of hay bales 2 when same are substantially longitudinally aligned in a row and it is desired to move the agricultural vehicle forwardly during loading, the tongue member 7 is positioned in the second position 10 with the vehicle 1 parallel with and laterally offset from the prime mover 9. When the trailer 1 is positioned so that a hay bale 2 is aligned with a respective pair of bale lifting and supporting members 6, same are moved to the bale supporting position. The process is repeated until each of the bale lifting and supporting members 6 has a respective hay bale 2 supported thereon. The vehicle 1 is then backed until clear of the row of remaining hay bales 2 and the tongue member 7 is then moved to the first position 8 so that the vehicle 1 and supported hay bales 2 may be moved along a road or highway. When the agricultural vehicle 1 is to be backed to collect the hay bales 2, the tongue member 7 may be in the first or bale transporting position 8 and after the hay bales 2 have been lifted and supported by the bale lifting and supporting members 6, the vehicle 1 may be moved along a road or highway.

It is to be understood that while We have illustrated and described certain forms of our invention, it is not to be limited to these specific forms or arrangement of parts herein described and shown.

What we claim and desire to secure by letters patent is:

1. An agricultural vehicle for transporting round bales and comprising:
    a. a mobile frame for movement over the ground and having a forward end and a trailing end, said frame having longitudinally extending side members and a plurality of transverse members;
    b. longitudinally extending bale lifting and supporting members arranged in a laterally opposed pair, each bale supporting member depending from at least one of said side members of said frame at a side thereof and movably mounted thereon;
    c. means on said frame and operatively connected to said bale supporting members for moving same between a depending position and an inwardly inclined bale supporting position, said bale supporting members respectively including an arm pivotally mounted to said frame at one end thereof for pivotal movement transversally of said frame, an extension engaged with the other end of said arm and adapted to increase the effective length of said arm upon movement of said arm to bale supporting position thereby lifting a bale substantially out of contact with the ground for transport; and
    d. means for connecting said frame to a prime mover for propelling said mobile frame.

2. An agricultural vehicle as set forth in claim 1 said connecting means includes a tongue member having one end portion thereof connected to the forward end of said frame and an opposite end portion capable of being connected to the prime mover.

3. An agricultural vehicle as set forth in claim 2 wherein:
    a. said frame has a longitudinal center line positioned intermediate said frame side members;
    b. said tongue member one end portion is pivotally connected to one of said frame side members; and
    c. said tongue member and said one side member include cooperating means for retaining said tongue member in a first position with the tongue member opposite end portion substantially aligned with the frame longitudinal center line whereby a prime mover and said frame are in substantial longitudinal alignment, said cooperating means including means for retaining said tongue member in a second position with the tongue member opposite end portion positioned outwardly from said one side member of said frame whereby the prime mover and said frame are in substantially parallel and laterally offset positions.

4. An agricultural vehicle as set forth in claim 1 including:
    a. first and second rear bale guides on said frame trailing end and each diverging rearwardly and outwardly from a respective one of said frame side members; and
    b. first and second forward bale guides on said frame forward end and each diverging forwardly and outwardly from a respective one of said frame side members.

5. An agricultural vehicle as set forth in claim 1 wherein said bale supporting members each includes:

a. an upper longitudinally extending member pivotally supported on a respective one of said frame side members;
b. a plurality of arms extending from said upper member; and said extension comprises
c. a lower member pivotally mounted on said arms and movable therewith into and out of engagement with a bale.

6. An agricultural vehicle as set forth in claim 5 wherein said lower member of said bale supporting members includes:
a. a plurality of arm extensions each pivotally mounted on a respective one of said bale supporting member arms;
b. a connection member mounted on and extending between said arm extensions and engageable with a hay bale; and
c. abutment means on each of said bale supporting member arms and engageable by said respective arm extensions to retain same in bale supporting position upon pivotal movement of said upper member and said arms extending therefrom to the bale support position.

7. An agricultural vehicle as set forth in claim 6 wherein:
a. said frame has a longitudinal center line positioned intermediate said frame side members;
b. said connecting means includes a tongue member having one end portion thereof connected to the forward end of said frame and an opposite end portion capable of being connected to the prime mover;
c. said tongue member one end portion is pivotally connected to one of said frame side members; and
d. said tongue member and said one side member include cooperating means for retaining said tongue member in one of a first position with the tongue member opposite end portion substantially aligned with the frame longitudinal center line and a second position with the tongue member opposite end portion positioned outwardly from said one side member of said frame.

8. An agricultural vehicle as set forth in claim 1 wherein:
a. said frame has a longitudinal center line positioned intermediate said frame side members; and
b. said frame transverse members each include:
 1. first and second upstanding portions each extending upwardly from a respective one of said frame side members;
 2. first and second inclined portions each extending upwardly and inwardly from a respective one of said upstanding portions; and
 3. a top member extending between said first and second inclined portions.

9. An agricultural vehicle as set forth in claim 8 including:
a. first and second upstanding portions each extending upwardly from a respective one of said frame side members and positioned adjacent the trailing end of said frame;
b. first and second rear bale guides on said frame trailing end first and second upstanding portions respectively, said first and second rear bale guides diverging rearwardly and outwardly from the respective first and second upstanding portions adjacent said frame trailing end;
c. first and second upstanding portions each extending upwardly from a respective one of said frame side members and positioned adjacent the forward end of said frame; and
d. first and second forward bale guides on said frame forward end first and second upstanding portions respectively, said first and second forward bale guides diverging forwardly and outwardly from the respective first and second upstanding portions adjacent said frame forward end.

10. An agricultural vehicle as set forth in claim 9 wherein:
a. said connecting means includes a tongue member having one end portion thereof connected to the forward end of said frame and an opposite end portion capable of being connected to the prime mover;
b. said tongue member one end portion is pivotally mounted on one of said first and second upstanding portions adjacent the forward end of said frame; and
c. said tongue member and said one upstanding portion adjacent the frame forward end include cooperating means for retaining said tongue member in a first position with the tongue member opposite end portion substantially aligned with the frame longitudinal center line whereby a prime mover and said frame are in substantial longitudinal alignment, said cooperating means including means for retaining said tongue member in a second position with the tongue member opposite end portion positioned outwardly from said one upstanding portion adjacent the frame forward end whereby the prime mover and said frame are in substantially parallel and laterally offset positions.

11. An agricultural vehicle as set forth in claim 10 wherein said bale supporting members each include:
a. an upper longitudinally extending member pivotally supported on a respective one of said frame side members;
b. a plurality of arms extending from said upper member; and
c. a lower member mounted on said arms and movable therewith into and out of engagement with a hay bale.

12. An agricultural vehicle as set forth in claim 11 wherein said lower member of said bale supporting members includes:
a. a plurality of arm extensions each pivotally mounted on a respective one of said bale supporting member arms;
b. a connection member mounted on and extending between said arm extensions and engageable with a hay bale; and
c. abutment means on each of said bale supporting member arms and engageable by said respective arm extensions to retain same in bale supporting position upon pivotal movement of said upper member and said arms extending therefrom to the bale support position.

13. An agricultural vehicle as set forth in claim 1 wherein said extension includes:
a. a wall member directed longitudinally of said frame and providing a substantial contact area for engaging said bale.

* * * * *